W. G. KIDD.
MOUNT FOR USE IN PHOTOGRAPH FRAMES.
APPLICATION FILED OCT. 9, 1917.
1,261,133.
Patented Apr. 2, 1918.
FIG. I
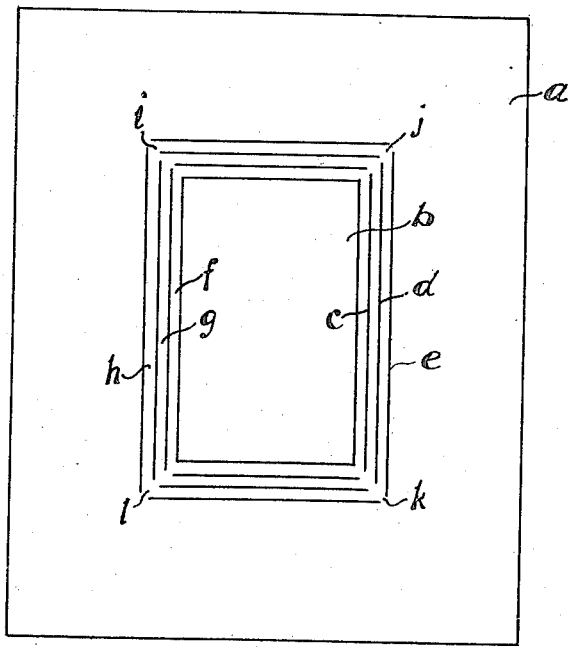
FIG. II.
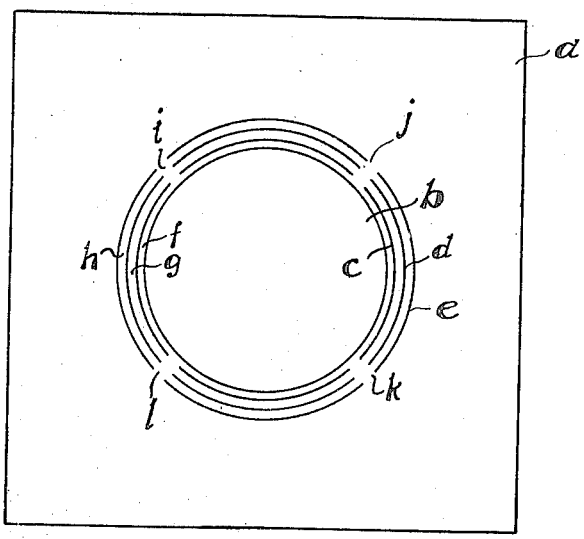
INVENTOR:
William George Kidd,
BY
ATTY.

W. G. KIDD.
MOUNT FOR USE IN PHOTOGRAPH FRAMES.
APPLICATION FILED OCT. 9, 1917.
1,261,133.
Patented Apr. 2, 1918.
FIG. III.
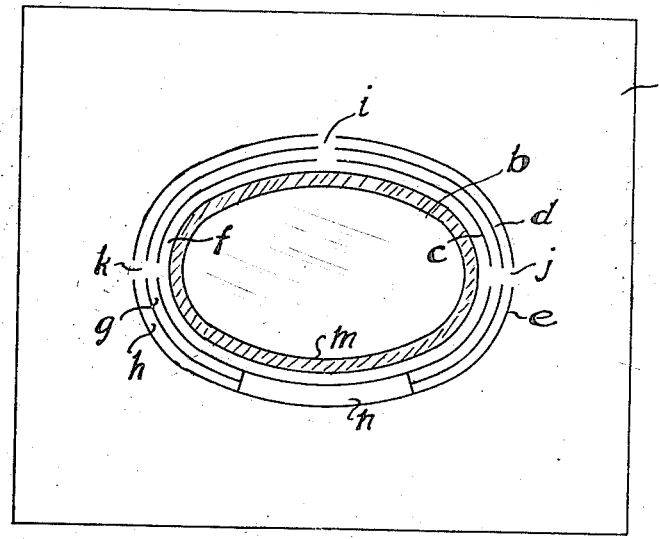
FIG. IV.
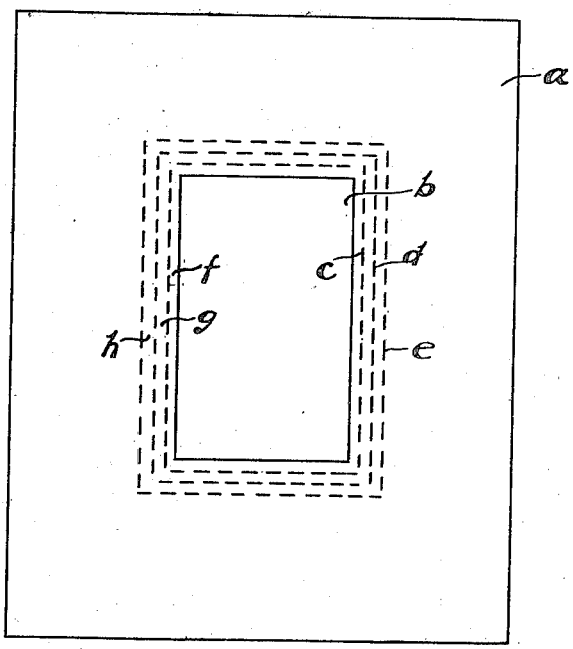
INVENTOR:
William George Kidd

UNITED STATES PATENT OFFICE.

WILLIAM GEORGE KIDD, OF DUNDEE, SCOTLAND.

MOUNT FOR USE IN PHOTOGRAPH-FRAMES.

1,261,133. Specification of Letters Patent. Patented Apr. 2, 1918.

Application filed October 9, 1917. Serial No. 195,496.

*To all whom it may concern:*

Be it known that I, WILLIAM GEORGE KIDD, a citizen of Great Britain, and resident of Palace Buildings, 7 Whitehall street, Dundee, in the county of Forfar, Scotland, have invented certain new and useful Mounts for Use in Photograph-Frames, of which the following is a specification.

This invention relates to mounts for use in connection with photograph and picture frames, photographic albums and other articles in which photographs, drawings, pictures, or the like are displayed. The object of the invention is to provide a mount, the area of whose opening may be readily increased to suit the particular size of photograph or picture it is desired to exhibit in the frame, album or the like.

According to this invention the mount, around the opening, is so cut, scored, or perforated that a portion or portions of the mount may be readily detached, so as to increase the area of the opening, when it is desired to exhibit a larger photograph or picture, or a larger portion of a photograph or picture, than that which the opening of the mount was originally designed to display.

The following description and accompanying drawings show manners of carrying out the invention.

Referring to the drawings:

Figure I shows a mount having a rectangular opening with incisions parallel to the sides of the opening.

Fig. II shows a mount having a circular opening with circular incisions surrounding it.

Fig. III shows an oval mount in which two sheets of material are employed.

Fig. IV shows a mount in which short perforations take the place of the long incisions of Fig. I.

In Fig. I the mount $a$ is provided with a rectangular opening $b$ to admit of a photograph, drawing, picture or the like being exhibited in the opening. Parallel to each side of the opening incisions $c$, $d$, $e$ are made through the mount, the strips $f$, $g$, $h$ remaining attached to the mount owing to the incisions not meeting at the corners, thus leaving small portions $i$, $j$, $k$, $l$ uncut which provide sufficient material to connect the strips to the mount.

In Fig. II the mount is provided with a circular opening and circular incisions, the reference letters corresponding with those of Fig. I.

When it is desired to remove one or more of the strips $f$, $g$, $h$ so as to enlarge the area of the opening $b$, the blade of a pen-knife is inserted in the desired incisions and the incisions at the corners are completed so that the detached strips may be removed, thus increasing the size of the opening and permitting a larger photograph or picture, or a larger portion of a photograph or picture, to be exhibited.

The incisions may take the form of long or short perforations, or the mount may be scored, without being cut right through. The portions which are left uncut for securing the strips to the mount may be scored, so as to enable the strips to be more readily and more cleanly removed.

In Fig. III two sheets of material are superimposed one above the other, one sheet being of a different shade or color to the other. Each sheet is cut, scored, or perforated so that the area of the opening may be enlarged.

The lower sheet appears at $m$ and forms a border to the opening $b$ of a different shade or color.

If it is desired to enlarge the opening some or all of the strips $f$, $g$, $h$ are removed and some or all of the corresponding strips of the lower sheet are also removed, but in such a manner that a strip $m$ is always visible in the opening $b$.

A portion at $n$ is shown cut away for the purpose of providing a space in which to write the title or a description of the photograph or picture in the mount.

The lines on the mount, which arise from the cutting, scoring or perforations, appear as a border to the opening and they may take the form of fancy patterns, such as scrolls or waved lines.

When the invention is applied to albums all or some of the openings may be treated as described.

What I claim is:—

1. A mount for use in photograph frames and albums, an opening in said mount and detachable portions surrounding said opening for the purpose of allowing the area of said opening to be increased when it is desired to exhibit a larger photograph or picture than the mount was originally designed to display.

2. A mount for use in photograph frames and albums, an opening in said mount and perforations surrounding said opening so that detachable portions may be removed for the purpose of allowing the area of said opening to be increased.

3. A mount for use in photograph frames and albums consisting of two sheets of material one being superimposed above the other, openings in said sheets and detachable portions surrounding said openings for the purpose of allowing the area of said openings to be increased, when it is desired to exhibit a larger photograph or picture than the mount was originally designed to display.

Signed at Dundee in the county of Forfar, Scotland.

WILLIAM GEORGE KIDD.

Witnesses:
EDITH LAWSON,
THEODORE WILLIAM DOUBBLE.